(12) United States Patent
Steiner et al.

(10) Patent No.: US 11,159,473 B2
(45) Date of Patent: Oct. 26, 2021

(54) SYSTEMS AND METHODS FOR SHARING CONTENT

(71) Applicant: Facebook, Inc., Menlo Park, CA (US)

(72) Inventors: Matthew Steiner, Los Altos, CA (US); Alexander Salem Franklin, Cupertino, CA (US); Evan Gabriel Brooks, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 337 days.

(21) Appl. No.: 15/289,838

(22) Filed: Oct. 10, 2016

(65) Prior Publication Data
US 2018/0103006 A1 Apr. 12, 2018

(51) Int. Cl.
| G06F 3/00 | (2006.01) |
| G06F 17/00 | (2019.01) |
| H04L 12/58 | (2006.01) |
| G06K 9/00 | (2006.01) |
| G06F 16/9535 | (2019.01) |
| G06F 3/0481 | (2013.01) |
| G06Q 50/00 | (2012.01) |
| G06Q 10/10 | (2012.01) |

(52) U.S. Cl.
CPC .......... *H04L 51/32* (2013.01); *G06F 3/04817* (2013.01); *G06F 16/9535* (2019.01); *G06K 9/00228* (2013.01); *G06K 9/00677* (2013.01); *G06Q 10/10* (2013.01); *G06Q 50/01* (2013.01); *H04L 51/10* (2013.01)

(58) Field of Classification Search
CPC ..... H04L 51/32; G06F 3/0482; G06F 3/0484; G06F 17/30867; G06F 16/9535; G06F 40/166; G06K 9/00228; G06K 9/00268; G06K 9/00288

USPC .................................................. 715/752, 200
See application file for complete search history.

(56) References Cited

U.S. PATENT DOCUMENTS

| 10,223,578 B2* | 3/2019 | Shah .................. G06K 9/00281 |
| 2009/0324022 A1* | 12/2009 | Sangberg .......... G06F 17/30265 382/118 |
| 2011/0249144 A1* | 10/2011 | Chang ............... G06F 17/30259 348/231.3 |
| 2012/0124147 A1* | 5/2012 | Hamlin ................... H04L 51/16 709/206 |
| 2012/0124483 A1* | 5/2012 | Zuckerberg ............. H04L 51/16 715/752 |

(Continued)

OTHER PUBLICATIONS

Constine, Josh, "Fb Messenger's Facial Recognition "Photo Magic" Reminds You to Send Friends Photos of Them," AOL Inc., TechCrunch website, Nov. 9, 2015.

*Primary Examiner* — Manglesh M Patel
(74) *Attorney, Agent, or Firm* — Sheppard Mullin Richter & Hampton LLP

(57) ABSTRACT

Systems, methods, and non-transitory computer-readable media can determine that at least one image has been captured using the computing device, wherein one or more individuals are represented in the image. An identity of at least a first individual of the one or more individuals represented in the image is determined, wherein the identity of the first individual is determined, at least in part, using a social networking system. A notification is presented through a display of the computing device, wherein the notification provides an option to send a message including the captured image to the first individual.

20 Claims, 9 Drawing Sheets

(56) References Cited

U.S. PATENT DOCUMENTS

| | | | |
|---|---|---|---|
| 2014/0012927 A1* | 1/2014 | Gertzfield | G06F 16/252 |
| | | | 709/206 |
| 2014/0129627 A1* | 5/2014 | Baldwin | H04L 67/306 |
| | | | 709/204 |
| 2014/0280530 A1* | 9/2014 | Fremlin | H04L 67/306 |
| | | | 709/204 |
| 2015/0066941 A1* | 3/2015 | Martin | G06F 17/30321 |
| | | | 707/741 |
| 2016/0050171 A1* | 2/2016 | Salvador | H04L 61/1594 |
| | | | 709/206 |
| 2017/0180294 A1* | 6/2017 | Milligan | H04L 51/02 |

* cited by examiner

SYSTEMS AND METHODS FOR SHARING CONTENT

FIELD OF THE INVENTION

The present technology relates to the field of content sharing. More particularly, the present technology relates to techniques for sharing content items between computing devices.

BACKGROUND

Today, people often utilize computing devices (or systems) for a wide variety of purposes. Users can operate their computing devices to, for example, interact with one another, create content, share content, and access information. Under conventional approaches, content items (e.g., images, videos, audio files, etc.) can be made available through a content sharing platform. Users can operate their computing devices to access the content items through the platform. Typically, the content items can be provided, or uploaded, by various entities including, for example, content publishers and also users of the content sharing platform.

SUMMARY

Various embodiments of the present disclosure can include systems, methods, and non-transitory computer readable media configured to determine that at least one image has been captured using the computing device, wherein one or more individuals are represented in the image. An identity of at least a first individual of the one or more individuals represented in the image is determined, wherein the identity of the first individual is determined, at least in part, using a social networking system. A notification is presented through a display of the computing device, wherein the notification provides an option to send a message including the captured image to the first individual.

In an embodiment, the systems, methods, and non-transitory computer readable media are configured to determine that a user operating the computing device has selected the option to send the message to the first individual and send the message to the first individual through a messaging platform, the message including the captured image.

In an embodiment, the systems, methods, and non-transitory computer readable media are configured to receive information describing an identity of a second individual that is represented in the captured image, the information being provided by the user operating the computing device and send the message to the second individual through the messaging platform, the message including the captured image.

In an embodiment, the systems, methods, and non-transitory computer readable media are configured to determine that the user has accessed a messaging interface that is provided by an application running on the computing device and present the messaging interface through the display of the computing device, wherein the messaging interface includes at least one conversation thread that corresponds to the user and the first user, and wherein the sent message including the captured image is in the conversation thread.

In an embodiment, the systems, methods, and non-transitory computer readable media are configured to generate respective thumbnail images from the captured image, each thumbnail image corresponding to a face of the one or more individuals represented in the captured image, send the thumbnail images to the social networking system for identification, and receive information from the social networking system, wherein the information describes at least the identity of the first individual.

In an embodiment, the information received from the social networking system only includes identities of individuals that are social connections of the user in the social networking system.

In an embodiment, the information received from the social networking system only includes identities of individuals having a social relationship with the user in the social networking system that satisfies a specified degree of separation.

In an embodiment, the systems, methods, and non-transitory computer readable media are configured to determine that the captured image was added to a camera roll directory associated with the computing device.

In an embodiment, the systems, methods, and non-transitory computer readable media are configured to determine that a notification was generated by an application running on the computing device indicating that the at least one image was captured.

In an embodiment, the first individual has a social profile that is published through the social networking system.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
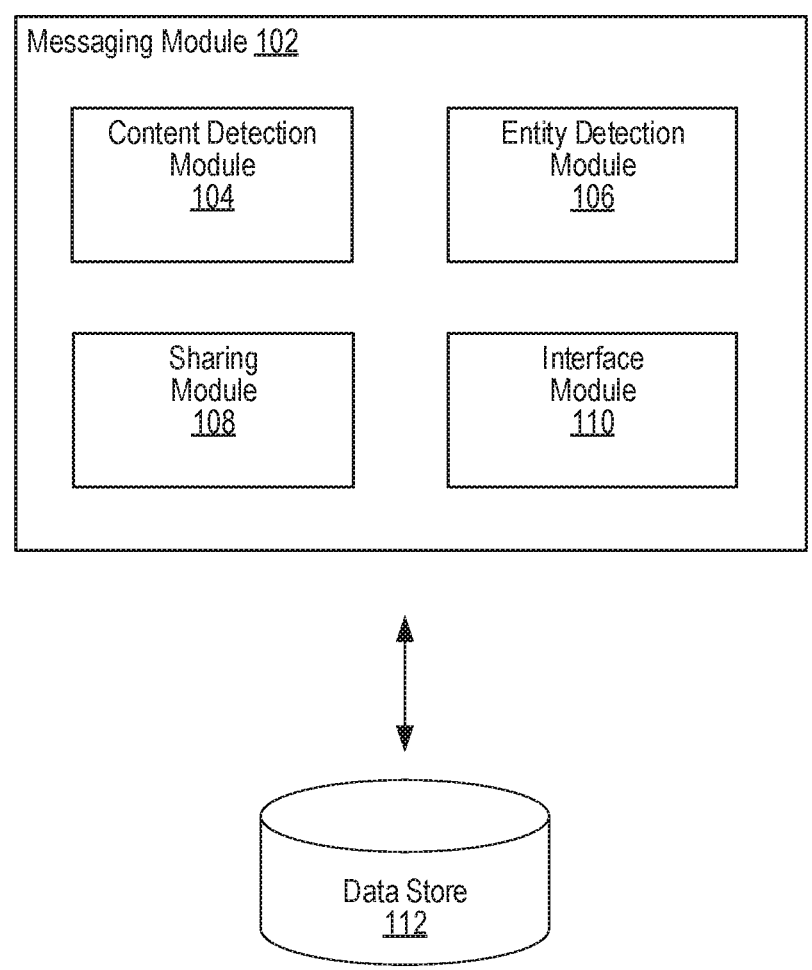
FIG. 1 illustrates an example system including an example messaging module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Sharing Content

Today, people often utilize computing devices (or systems) for a wide variety of purposes. Users can operate their computing devices to, for example, interact with one another, create content, share content, and access information. Under conventional approaches, content items (e.g., images, videos, audio files, etc.) can be made available through a content sharing platform. Users can operate their computing devices to access the content items through the platform. Typically, the content items can be provided, or uploaded, by various entities including, for example, content publishers and also users of the content sharing platform.

A user may rely on such content sharing platforms (e.g., a social networking system) to share content items (e.g., images, videos, audio, etc.) that were captured by the user through a computing device. In some instances, a content item, such as an image, may include individuals that are family and/or friends of the user. In such instances, the user may want to share the image with those individuals. Under conventional approaches, the user may share the image publically through a content sharing platform. Alternatively, the image may be shared privately after the user specifically designates each of those individuals as a recipient through the content sharing platform or some other form of communication (e.g., e-mail, text messaging, etc.). The task of designating recipients under conventional approaches can be burdensome and, in some instances, impossible unless the user has the recipient's contact information (e.g., e-mail, phone number, etc.). In another example, the user may forget to send the captured image to the individuals in the image and, as a result, the image may go unshared. Accordingly, such conventional approaches may not be effective in addressing these and other problems arising in computer technology.

An improved approach rooted in computer technology overcomes the foregoing and other disadvantages associated with conventional approaches specifically arising in the realm of computer technology. In various embodiments, individuals in the captured image may be identified (e.g., named), for example, through a social networking system. Once identified, one or more notifications can be sent to the user of the computing device that captured the image asking whether the user wants to share the image with the identified individuals. The user can select an option to share the image with the identified individuals by sending a message to the individuals through the social networking system and/or a computing system (e.g., a messaging platform) that is configured to facilitate the sending and receiving of such messages.

FIG. 1 illustrates an example system 100 including an example messaging module 102, according to an embodiment of the present disclosure. As shown in the example of FIG. 1, the messaging module 102 can include a content detection module 104, an entity detection module 106, a sharing module 108, and an interface module 110. In some instances, the example system 100 can include at least one data store 112. The components (e.g., modules, elements, etc.) shown in this figure and all figures herein are exemplary only, and other implementations may include additional, fewer, integrated, or different components. Some components may not be shown so as not to obscure relevant details.

In some embodiments, the messaging module 102 can be implemented, in part or in whole, as software, hardware, or any combination thereof. In general, a module, as discussed herein, can be associated with software, hardware, or any combination thereof. In some implementations, one or more functions, tasks, and/or operations of modules can be carried out or performed by software routines, software processes, hardware, and/or any combination thereof. In some cases, the messaging' module 102 can be implemented, in part or in whole, as software running on one or more computing devices or systems, such as on a user computing device or client computing system. For example, the messaging module 102, or at least a portion thereof, can be implemented as or within an application (e.g., app), a program, or an applet, etc., running on a user computing device or a client computing system, such as the user device 610 of FIG. 6. Further, the messaging module 102, or at least a portion thereof, can be implemented using one or more computing devices or systems that include one or more servers, such as network servers or cloud servers. In some instances, the messaging module 102 can, in part or in whole, be implemented within or configured to operate in conjunction with a social networking system (or service), such as the social networking system 630 of FIG. 6. It should be understood that there can be many variations or other possibilities.

Figure 6:
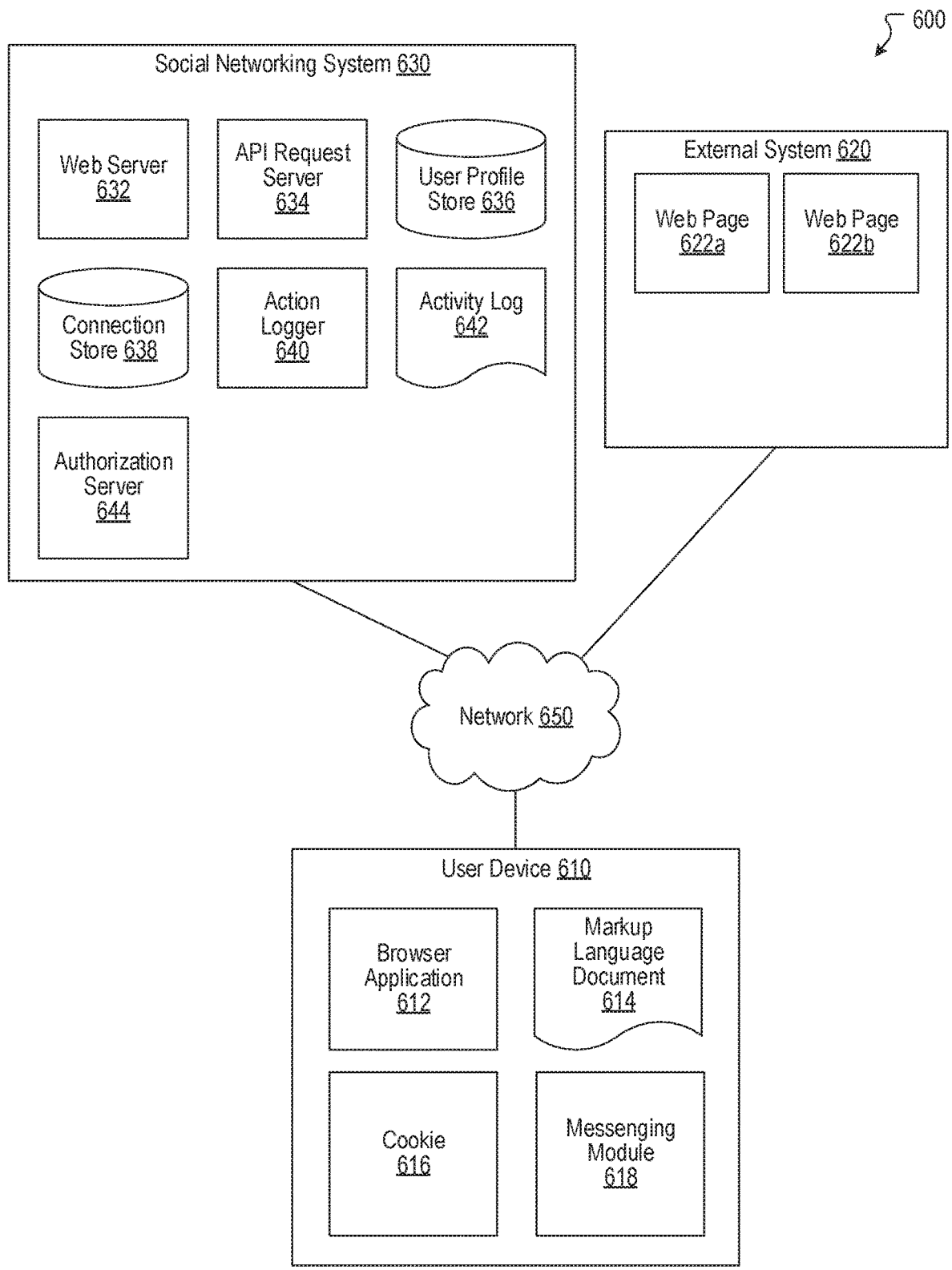
FIG. 6 illustrates a network diagram of an example system including an example social networking system that can be utilized in various scenarios, according to an embodiment of the present disclosure.

As mentioned, the messaging module 102 can be implemented in a computing device (e.g., the user device 610 of FIG. 6). The computing device may be capable of capturing and storing various forms of content. For example, the computing device may include one or more cameras through which images and/or videos may be captured. Further, the computing device may include one or more microphones through which audio may be captured. In various embodiments, the content detection module 104 can determine when content has been captured using the computing device. For example, in some embodiments, the content detection module 104 can determine that an image was captured using the computing device by polling a camera roll directory in which content items are stored after being captured. The camera roll directory may exist in a data store that is accessible to the computing device such as the data store 112, for example. In some embodiments, an operating system running on the computing device can be configured to provide the content detection module 104 with one or more notifications when a content item is captured using the computing device.

Once the content detection module 104 has determined that a content item was captured, the entity detection module 106 can analyze the content item to identify one or more entities associated with the content item. For example, the entity detection module 106 can determine the presence of any individuals in a captured image. The entity detection module 106 can similarly determine the presence of individuals in captured video or audio content. The entity detection module 106 can also determine whether any of the individuals are social connections of the user operating the computing device. More details regarding the entity detection module 106 will be provided below in reference to FIG. 2. In various embodiments, the sharing module 108 can be utilized to send messages that include the captured content item, for example, to the user's social connections that were identified in the captured content item. More details regarding the sharing module 108 will be provided below in reference to FIG. 3.

The interface module 110 can be configured to provide an interface (e.g., graphical user interface) through which users can send and receive messages, for example, through the social networking system (e.g., the social networking system 630 of FIG. 6) and/or a third-party computing system. The interface can be provided by a software application running on a computing device and through a display screen associated with the computing device. The user can interact with the interface, for example, by performing touch screen gestures through a display screen of the computing device or using some other input apparatus (e.g., mouse). In some embodiments, messages sent by users can include one or more content items that are sent as part of the message or as attachments. These content items may include, for example, audio files, images, videos, and/or links to various content.

In some embodiments, the messaging module 102 can be configured to communicate and/or operate with the at least one data store 112 in the example system 100. The at least one data store 112 can be configured to store and maintain various types of data. In various embodiments, the at least one data store 112 can store data relevant to function and operation of the messaging module 102. In some implementations, the at least one data store 112 can store information associated with the social networking system (e.g., the social networking system 630 of FIG. 6). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 112 can store information associated with users, such as user identifiers, user information, profile information, user specified settings, content produced or posted by users, and various other types of user data. It should be appreciated that there can be many variations or other possibilities.

Figure 2:
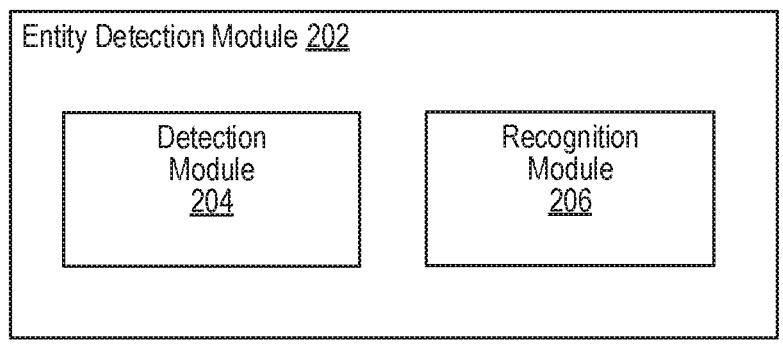
FIG. 2 illustrates an example of an entity detection module, according to an embodiment of the present disclosure.

FIG. 2 illustrates an example of an entity detection module 202, according to an embodiment of the present disclosure. In some embodiments, the entity detection module 106 of FIG. 1 can be implemented as the entity detection module 202. As shown in FIG. 2, the entity detection module 202 can include a detection module 204 and a recognition module 206.

In various embodiments, the entity detection module 202 is configured to analyze content items to determine the presence of one or more individuals. Such content items may have been captured by a user of the computing device in which the entity detection module 202 is implemented, as described in reference to FIG. 1. For example, when an image capture is detected, the detection module 204 can be configured to identify regions in the image that correspond to human faces. In various embodiments, such regions can be identified by applying generally known face detection techniques. In some instances, the captured image may include human faces that are positioned at various angles. To help ensure that such human faces are identified, in some embodiments, the detection module 204 can rotate the image in different directions and perform generally known face detection techniques upon each rotation. In one example, face detection can be applied to the image in the state at which the image was captured. The image can then be rotated 45 degrees and face detection can again be applied. In another example, the image can be rotated another 45 degrees and face detection can again be applied. Similarly, the image can be rotated another 45 degrees and face detection can again be applied. In some embodiments, the computing device on which the detection module 204 is implemented may be running software that provides built-in face detection technology. For example, the computing device may be running the iOS operating system. In such embodiments, the detection module 204 can invoke the built-in face detection technology to identify regions in the image that correspond to human faces.

Once human faces in the captured image have been detected, the detection module 204 can extract, or crop, respective thumbnail images for each of the detected human faces. In general, a thumbnail image of a human face is an image of a region in the captured image that corresponds to just the human face. In some embodiments, the detection module 204 can modify the dimensions of the extracted thumbnail images to improve face recognition accuracy as needed. For example, the detection module 204 can increase or decrease the respective sizes at which thumbnail images are extracted to improve face recognition accuracy. The detection module 204 is not limited to detecting just human faces and, depending on the implementation, the detection module 204 may also be configured to identify regions in the image that correspond to other concepts such as activities, objects, products, logos, animals, to name some examples.

In various embodiments, the recognition module 206 is configured to identify or, name, the individuals, or concepts, that are represented in the thumbnail images that were extracted by the detection module 204. In some embodiments, the recognition module 206 sends the thumbnail images to a social networking system (e.g., the social networking system 630 of FIG. 6) for processing. In some embodiments, the recognition module 206 sends the thumbnail images to the social networking system in real-time, i.e., as soon as the thumbnail images are generated by the detection module 204. The computing device on which the recognition module 206 is implemented and the social networking system may be configured to communicate with one another over a network (e.g., the Internet). In such embodiments, the social networking system can analyze the thumbnail images to identify individuals and/or concepts that are represented in the thumbnail images. In some embodiments, the social networking system can utilize a machine learning model (image classifier) to identify features (e.g., identities, or names, of individuals, objects, activities, products, logos, etc.) that are represented in the thumbnail images. For example, the image classifier can be trained to predict a likelihood that a certain individual is present in a thumbnail image. In such embodiments, the image classifier can be trained using training data that includes a sample set of images. The image classifier can be based on any machine learning technique, including but not limited to a deep convolutional neural network. Similar machine learning models can be utilized for identifying features (e.g., individuals, concepts, etc.) in other types of content such as videos and audio. In some embodiments, the messaging module 102 of FIG. 1 is implemented as part of a software application that is running on the computing device. In such embodiments, the user operating the computing device can access the software application by providing login credentials or some other form of authentication (e.g., biometric data). These login credentials may have been created through a social networking system (e.g., the social networking system 630 of FIG. 6), for example. Upon logging in, the software application may be configured to interact with the social networking system.

In various embodiments, a social graph that is managed by the social networking system can be utilized when identifying individuals in thumbnail images. As described further in reference to FIG. 6, the social graph can include nodes and some of these nodes may each correspond to a user of the social networking system. A social connection that is established electronically between two users of the social networking system can be represented in the social graph by an edge connecting the nodes corresponding to the two users, for example. In some embodiments, when identifying individuals in thumbnail images, the social networking system can determine the respective social relationships between the user of the computing device and the identified individuals as recognized by the social networking system. In such embodiments, the user of the computing device and the identified individuals are all users of the social networking system that have respective social profiles that are published through the social networking system. For example, the social networking system (or the recognition module 206) can determine whether the user of the computing device and a user identified in a thumbnail image are directly connected in the social graph, i.e., the users are recognized as social connections (e.g., friends) by the social networking system. Users that are friends have zero degrees of separation as recognized by the social networking system. If the two users are not friends, i.e., the users are not recognized as social connections by the social networking system, then the social networking system (or the recognition module 206) can determine the number of degrees of separation between the two users using the social graph. For example, the two users may have one degree of separation which means the user identified in the thumbnail image is a friend of a friend of the user operating the computing device.

In some embodiments, the social networking system (or the recognition module 206) limits the identification of individuals captured in the thumbnail images to only those individuals that satisfy a specified degree of separation (e.g., friends-of-friends). That is, in some embodiments, only users that have no more than one degree of separation from the user operating the computing device are identified and/or labeled. In such embodiments, users that do not meet the degree of separation criteria are not identified or labeled and, therefore, no identification information of such users is provided to the user operating the computing device. In some embodiments, no degree of separation limitation exists and the social networking system (or the recognition module 206) identifies all individuals captured in the thumbnail images. In some instances, an individual captured in the thumbnail images may not be a user of the social networking system. In such instances, the social networking system may not identify or label the individual. In some embodiments, however, the social networking system can be configured to identify an individual captured in the thumbnail images despite the individual not being a user of the social networking system. Once the features (e.g., individuals) in the thumbnail images have been identified and/or labeled, the social networking system can send data describing the features to the computing device on which the recognition module 206 is implemented. The identification information provided by the social networking system can be used to send one or more notifications to the user operating the computing device asking whether the user wants to electronically share images in which the identified individuals appear with those identified individuals, as described in reference to the sharing module 302 of FIG. 3.

Figure 3:
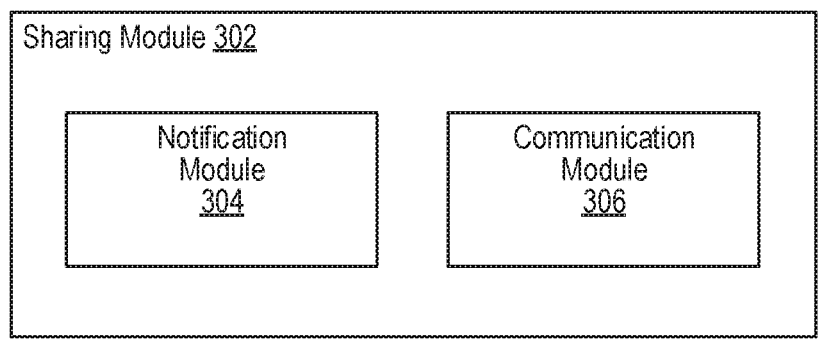
FIG. 3 illustrates an example of a sharing module, according to an embodiment of the present disclosure.

FIG. 3 illustrates an example of a sharing module 302, according to an embodiment of the present disclosure. In some embodiments, the sharing module 108 of FIG. 1 can be implemented as the sharing module 302. As shown in FIG. 3, the sharing module 302 can include a notification module 304 and a communication module 306.

The notification module 302 can send one or more notifications (e.g., messages, pop-up notifications, etc.) to the user operating the computing device asking whether the user wants to share the captured image with the individuals that were identified in the captured image. In some instances, an individual in the image may be misidentified or not identified at all. In such instances, the user has the option to specify the identity, or the correct identity, of the individual through an interface provided by the computing device. Information that describes the individual's specified identity may be provided, for example, to the social networking system and/or a computing system (e.g., a messaging platform) that is configured to facilitate the sending and receiving of messages and this information may be used to improve identification of such misidentified or unidentified individuals. In some embodiments, the user has the option to choose which of the identified individuals will receive a copy of the captured image. For example, the user can interact with the computing device to remove certain identified individuals from the recipient list of the captured image. In some embodiments, if the user operating the computing device captured multiple content items that capture some aspect (e.g., images, videos, audio files, etc.) of the same set of individuals, then the notification module 302 can send a batch notification to ask whether the user wants to share the multiple content items with the set of identified users rather than sending a separate notification for each of the multiple content items. In some embodiments, notifications to the user are throttled at some specified rate so as not to overburden the user. Once the user selects an option to share the captured image with the identified and/or specified individuals, the communication module 306 can send a message including the captured image to the individuals through the social networking system and/or the computing system that is configured to facilitate the sending and receiving of messages. The message can be sent through a messaging interface as described in reference to FIGS. 4A-C. In various embodiments, the approaches described herein are able to determine whether the user operating the computing device is represented in a captured image. In instances where the user is represented in the captured image, the approaches can prevent the captured image from being sent back to the user in a message.

Figure 4A:
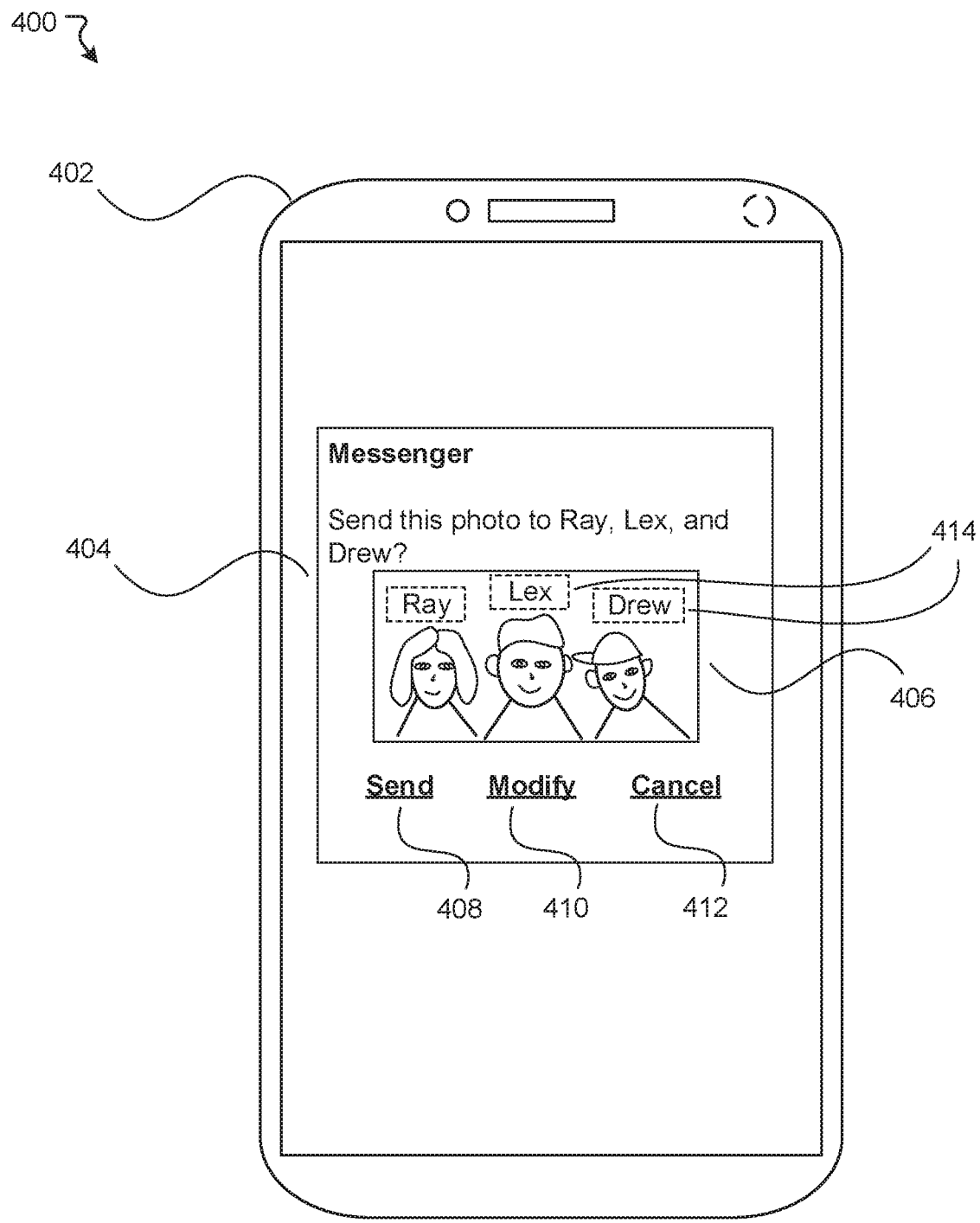
FIGS. 4A-C illustrate examples of interfaces through which messages can be sent and received, according to an embodiment of the present disclosure.

FIG. 4A illustrates an example 400 of a notification 404, according to an embodiment of the present disclosure. The notification 404 is presented through a display screen of the computing device 402. Further, the notification 404 may be provided through an application (e.g., a web browser, a social networking application, messenger application, etc.) running on the computing device 402. In the example of FIG. 4A, the user operating the computing device 402 had previously captured an image 406 that includes a set of individuals. In this example, the individuals in the image 406 can be identified, or named, as described above. Once the individuals in the image 406 have been identified, the notification 404 shown on the display screen of the computing device 402 asks whether the user operating the computing device wants to send the image 406 to the individuals that were identified in the image, e.g., Ray, Lex, and Drew. The user can select an option 408 to send the image in a message to the identified individuals, an option 410 to modify the recipients of the image, or an option 412 to not send the image to any of the identified individuals. In some embodiments, the individuals in the image 406 can be labeled 414 using their respective names as determined, for example, through the social networking system as described above. In some embodiments, the user can remove an individual from the recipient list by selecting an option to delete a label 414 corresponding to the individual.

Figure 4B:
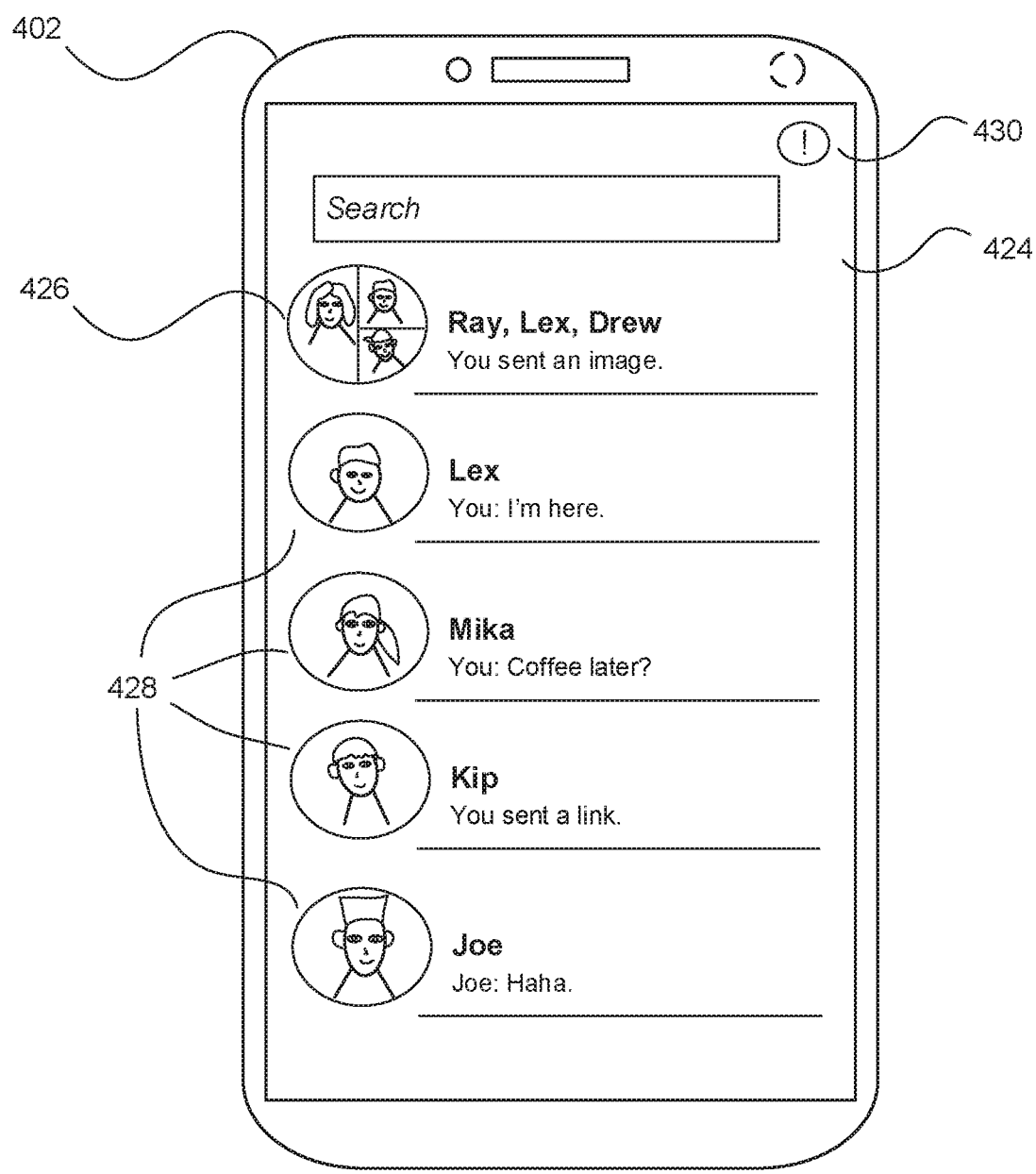
Figure 4C:
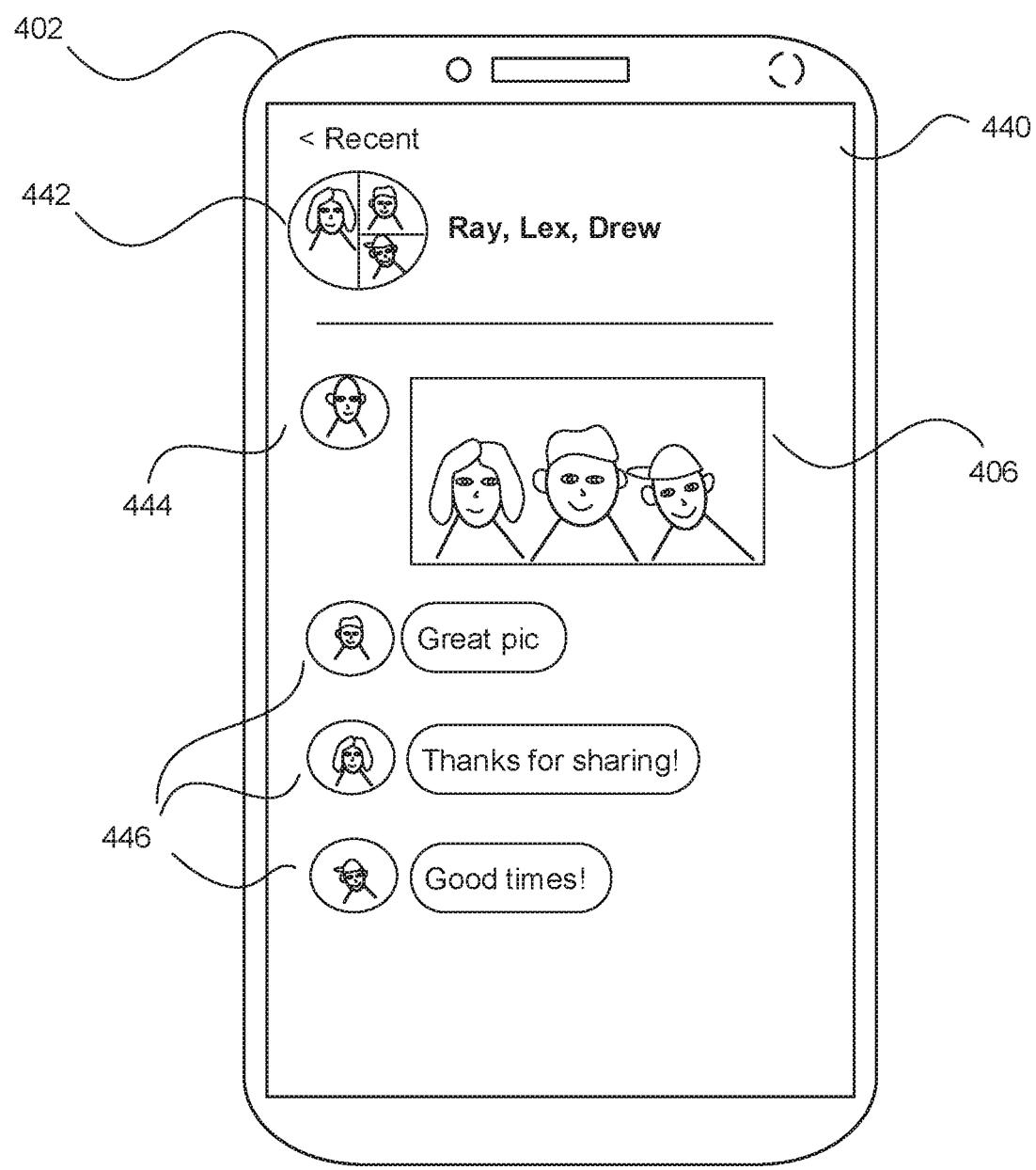

After the user selects the option 408 to send the image to the identified individuals, a message that includes the image can be sent to the recipients (e.g., the identified individuals as modified by the user). FIG. 4B illustrates an example messaging interface 424 through which messages can be sent and received as described in this specification. The messaging interface 424 may be provided through an application (e.g., a web browser, a social networking application, messenger application, etc.) running on the computing device 402. The messaging interface 424 includes a number of different messaging threads 426, 428 that each organize the messages that were communicated between the user and one or more recipients. In this example, the image that was sent to the identified individuals after the user selected the option 408 has been sent in a message thread 426 that corresponds to the individuals that were identified in the image (e.g., Ray, Lex, and Drew). In some embodiments, if no messaging thread for these recipients exists, then one is created. In some embodiments, if a messaging thread for these recipients already exists, then the existing thread is used for sending the image. The messaging interface 424 also includes other threads 428 that correspond to different recipients or sets of recipients. In some embodiments, the messaging interface 424 includes an option 430 that provides an indication when there are other content items that are ready to be sent to the various individuals that were identified in the respective content items. In such embodiments, any notifications (e.g., the notification 404) that were sent to the user, but were not acted upon, can again be presented to the user when the option 430 is selected. The user can scroll through the different notifications and/or content items to determine whether to send them to the individuals that were identified in the notifications and/or content items. FIG. 4C illustrates an example interface 440 that shows the messaging thread in which the image 406 was sent to the recipients Ray, Lex, and Drew 442. The interface 440 may be provided through an application (e.g., a web browser, a social networking application, messenger application, etc.) running on the computing device 402. The recipients can respond in the messaging thread with their own messages 446 in response to the user's message 444 as shown.

As mentioned, the approaches described above may be used to also identify concepts such as activities, objects, products, logos, animals, that appear in content items. In some embodiments, any products and/or product logos that are identified in captured images may be used for other purposes such as targeting advertisements to the user, assisting the user in ordering the products, and/or sharing such content items, for example, through one or more pages that are associated with the product(s) in the social networking system. In some embodiments, message threads can optionally, or automatically, be created with entities (e.g., individuals, corporations, organizations, customer support) based on captured content, such as audio data, messages (e.g., e-mails, texts, etc.), etc., for example. In one example, a text from an airline informing the user about a flight cancellation may cause a message thread to be created with a customer service representative of the airline. In another example, a corporation may be identified based on audio data (e.g., an advertisement or jingle corresponding to the corporation) that was captured by the computing device. In this example, a message thread with a representative of the corporation may optionally, or automatically, be created.

Figure 5:
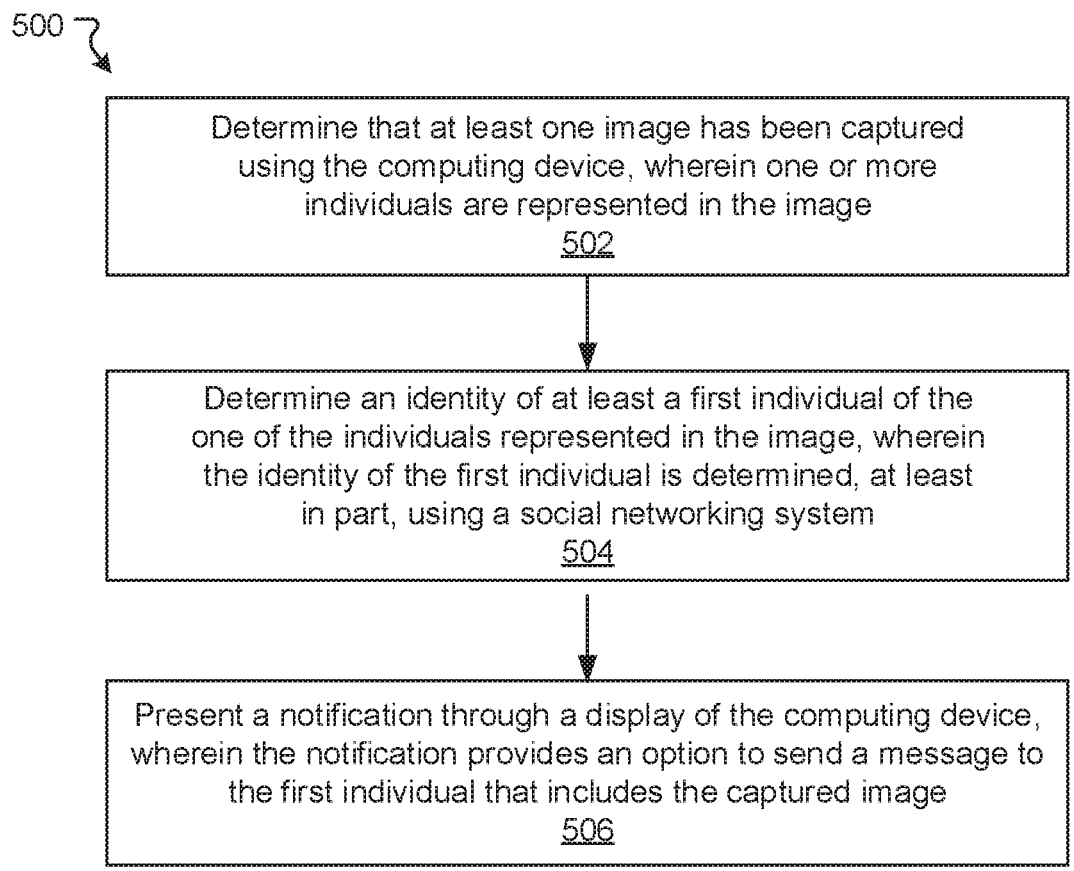
FIG. 5 illustrates an example process for sending messages, according to various embodiments of the present disclosure.

FIG. 5 illustrates an example process 500 for sending messages, according to various embodiments of the present disclosure. It should be appreciated that there can be additional, fewer, or alternative steps performed in similar or alternative orders, or in parallel, within the scope of the various embodiments discussed herein unless otherwise stated.

At block 502, a determination is made that at least one image has been captured using the computing device, wherein one or more individuals are represented in the image. At block 504, an identity of at least a first individual of the one or more individuals represented in the image is determined, wherein the identity of the first individual is determined, at least in part, using a social networking system. At block 506, a notification is presented through a display of the computing device, wherein the notification provides an option to send a message including the captured image to the first individual.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices (or systems) that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the Silverlight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content. As discussed previously, it should be appreciated that there can be many variations or other possibilities.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems

620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the user device 610 can include a messaging module 618. The messaging module 618 can, for example, be implemented as the messaging module 102 of FIG. 1. As discussed previously, it should be appreciated that there can be many variations or other possibilities.

Hardware Implementation

Figure 7:
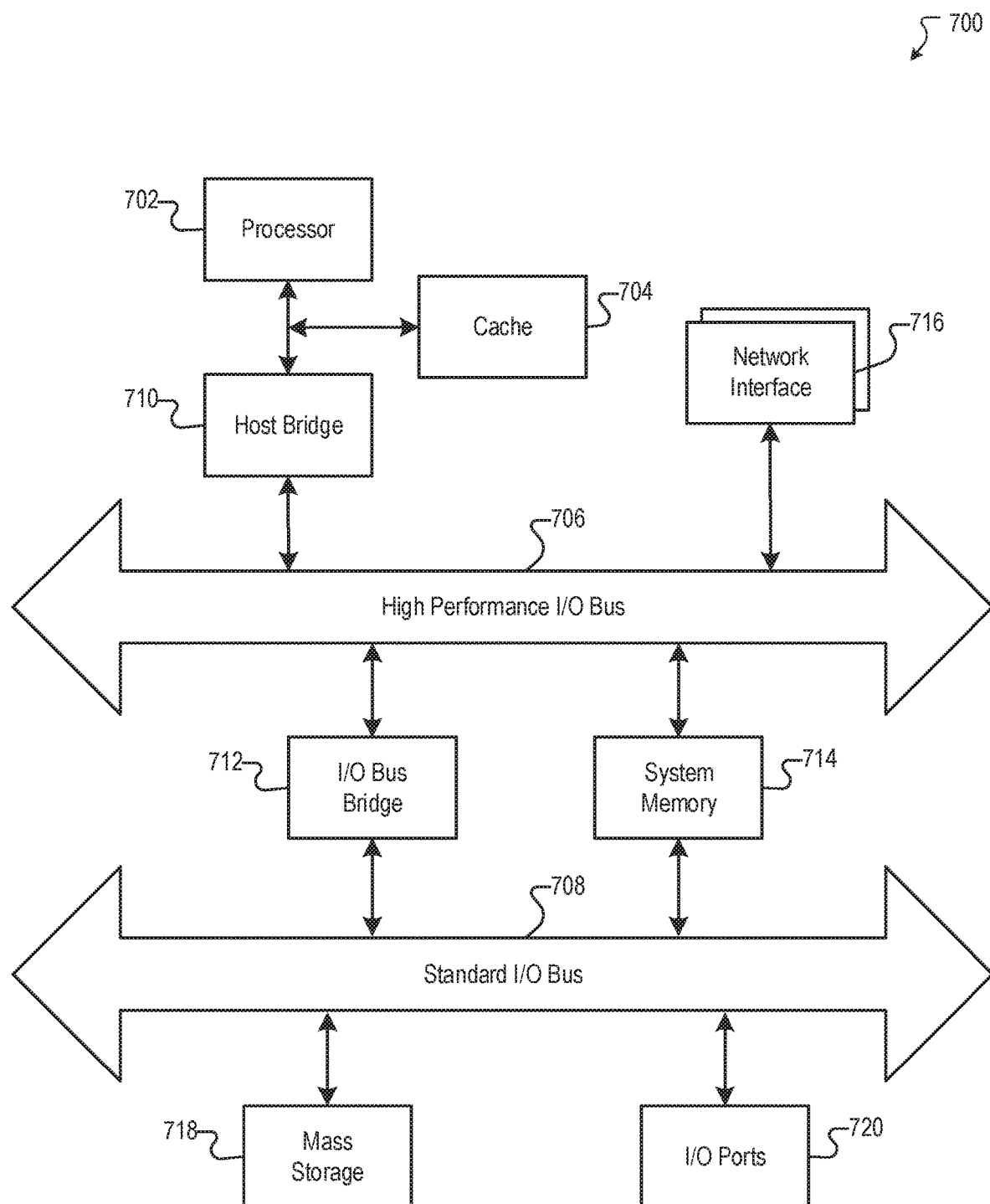
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   determining, by a computing device, that at least one image has been captured using the computing device, wherein one or more individuals are represented in the image;
   obtaining, by the computing device, an identity of at least a first individual of the one or more individuals represented in the image, wherein the identity of the first individual was is determined, at least in part, using an image classifier on a system, and wherein identification of individuals by the image classifier is limited based on a selected degree of separation from a user of the computing device;
   providing, by the computing device, a notification through a display of the computing device, wherein the notification provides an option to send a message including the captured image to the first individual and provides a label, in the captured image, displaying the identity of the first individual, wherein the identity of the first individual is correctable by the user; and
   identifying, by the computing device, an existing messaging thread that includes messages communicated between the user and the first individual, wherein the message including the captured image is sent through the existing message thread.

2. The computer-implemented method of claim 1, the method further comprising:
   determining, by the computing device, that the user of the computing device has selected the option to send the message to the first individual; and
   sending, by the computing device, the message to the first individual through a messaging platform, the message including the captured image.

3. The computer-implemented method of claim 2, the method further comprising:
   receiving, by the computing device, information describing an identity of a second individual that is represented in the captured image, the information being provided by the user of the computing device; and
   sending, by the computing device, the message to the second individual through the messaging platform, the message including the captured image.

4. The computer-implemented method of claim 2, the method further comprising:
   determining, by the computing device, that the user has accessed a messaging interface that is provided by an application running on the computing device; and
   presenting, by the computing device, the messaging interface through the display of the computing device, wherein the messaging interface includes at least one conversation thread that corresponds to the user and the first individual, and wherein the sent message including the captured image is in the conversation thread.

5. The computer-implemented method of claim 1, wherein obtaining an identity of at least one first individual further comprises:
generating, by the computing device, respective thumbnail images from the captured image, each thumbnail image corresponding to a face of the one or more individuals represented in the captured image;
sending, by the computing device, the thumbnail images to the system for identification; and
receiving, by the computing device, information from the system, wherein the information describes at least the identity of the first individual.

6. The computer-implemented method of claim 5, wherein the information received from the system only includes identities of individuals that are social connections of the user in the system.

7. The computer-implemented method of claim 5, wherein the information received from the system only includes identities of individuals having a social relationship with the user in the system that satisfies the selected degree of separation.

8. The computer-implemented method of claim 1, wherein determining that at least one image has been captured using the computing device further comprises:
determining, by the computing device, that the captured image was added to a camera roll directory associated with the computing device.

9. The computer-implemented method of claim 1, wherein determining that at least one image has been captured using the computing device further comprises:
determining, by the computing device, that a notification was generated by an application running on the computing device indicating that the at least one image was captured.

10. The computer-implemented method of claim 1, wherein a correction of the identity of the first individual and the captured image is provided as sample training data for further training the image classifier on the system.

11. A system comprising:
at least one processor; and
a memory storing instructions that, when executed by the at least one processor, cause the system to perform:
determining that at least one image has been captured using the computing device, wherein one or more individuals are represented in the image;
obtaining an identity of at least a first individual of the one or more individuals represented in the image, wherein the identity of the first individual is determined, at least in part, using an image classifier on a system, and wherein identification of individuals by the image classifier is limited based on a selected degree of separation from a user of the computing device;
providing a notification through a display of the computing device, wherein the notification provides an option to send a message including the captured image to the first individual and provides a label, in the captured image, displaying the identity of the first individual, wherein the identity of the first individual is correctable by the user; and
identifying an existing messaging thread that includes messages communicated between the user and the first individual, wherein the message including the captured image is sent through the existing message thread.

12. The system of claim 11, wherein the system further performs:
determining that a user of the computing device has selected the option to send the message to the first individual; and
sending the message to the first individual through a messaging platform, the message including the captured image.

13. The system of claim 12, wherein the system further performs:
receiving information describing an identity of a second individual that is represented in the captured image, the information being provided by the user operating of the computing device; and
sending the message to the second individual through the messaging platform, the message including the captured image.

14. The system of claim 12, wherein the system further performs:
determining that the user has accessed a messaging interface that is provided by an application running on the computing device; and
presenting the messaging interface through the display of the computing device, wherein the messaging interface includes at least one conversation thread that corresponds to the user and the first individual, and wherein the sent message including the captured image is in the conversation thread.

15. The system of claim 11, wherein obtaining an identity of at least one first individual further causes the system to perform:
generating respective thumbnail images from the captured image, each thumbnail image corresponding to a face of the one or more individuals represented in the captured image;
sending the thumbnail images to the system for identification; and
receiving information from the system, wherein the information describes at least the identity of the first individual.

16. A non-transitory computer-readable storage medium including instructions that, when executed by at least one processor of a computing system, cause the computing system to perform a method comprising:
determining that at least one image has been captured using the computing device, wherein one or more individuals are represented in the image;
obtaining an identity of at least a first individual of the one or more individuals represented in the image, wherein the identity of the first individual is determined, at least in part, using an image classifier on a system, and wherein identification of individuals by the image classifier is limited based on a selected degree of separation from a user of the computing device;
providing a notification through a display of the computing device, wherein the notification provides an option to send a message including the captured image to the first individual and provides a label, in the captured image, displaying the identity of the first individual, wherein the identity of the first individual is correctable by the user; and
identifying an existing messaging thread that includes messages communicated between the user and the first individual, wherein the message including the captured image is sent through the existing message thread.

17. The non-transitory computer-readable storage medium of claim 16, wherein the computing system further performs:

determining that the user of the computing device has selected the option to send the message to the first individual; and sending the message to the first individual through a messaging platform, the message including the captured image.

18. The non-transitory computer-readable storage medium of claim 17, wherein the computing system further performs:

receiving information describing an identity of a second individual that is represented in the captured image, the information being provided by the user of the computing device; and sending the message to the second individual through the messaging platform, the message including the captured image.

19. The non-transitory computer-readable storage medium of claim 17, wherein the computing system further performs:

determining that the user has accessed a messaging interface that is provided by an application running on the computing device; and presenting the messaging interface through the display of the computing device, wherein the messaging interface includes at least one conversation thread that corresponds to the user and the first individual, and wherein the sent message including the captured image is in the conversation thread.

20. The non-transitory computer-readable storage medium of claim 16, wherein obtaining an identity of at least one first individual further causes the computing system to perform:

generating respective thumbnail images from the captured image, each thumbnail image corresponding to a face of the one or more individuals represented in the captured image;

sending the thumbnail images to the system for identification; and receiving information from the system, wherein the information describes at least the identity of the first individual.

* * * * *